Figure 1:
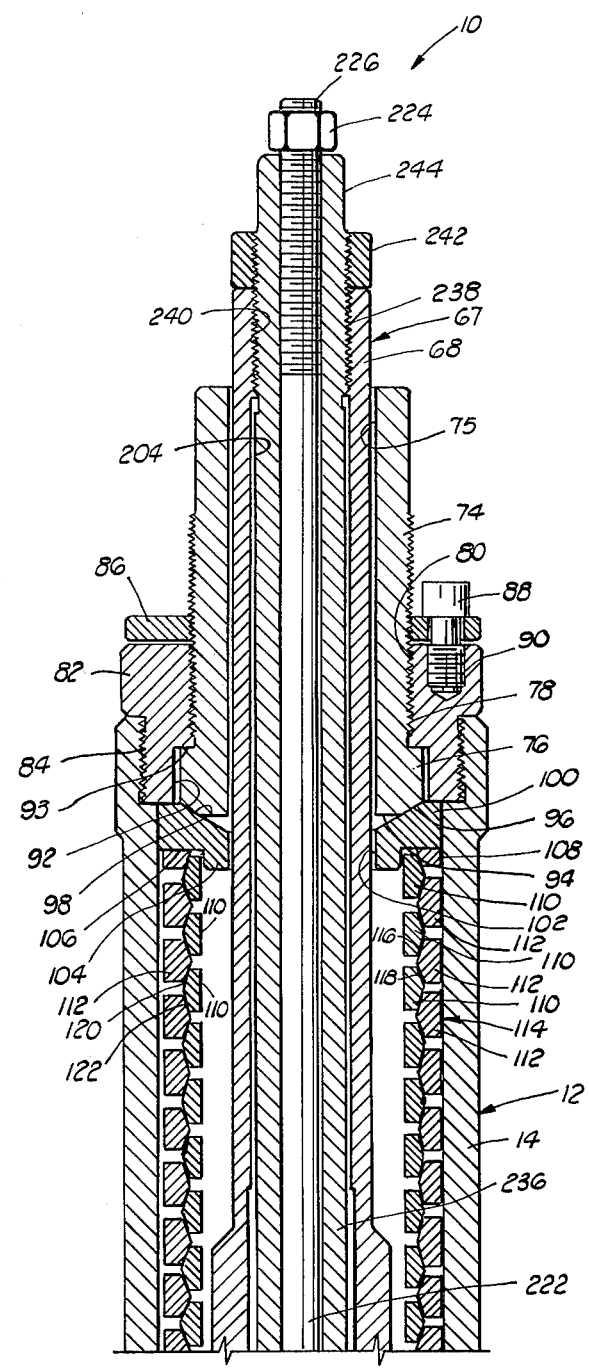

United States Patent [19]

Freeman, Jr.

[11] 4,248,265
[45] Feb. 3, 1981

[54] ADJUSTABLE RELIEF VALVE

[75] Inventor: Norman L. Freeman, Jr., Duncan, Okla.

[73] Assignee: Halliburton Services, Duncan, Okla.

[21] Appl. No.: 959,985

[22] Filed: Nov. 13, 1978

[51] Int. Cl.³ .............................................. F16K 17/10
[52] U.S. Cl. ................................ 137/494; 137/512.1; 137/512.2; 137/513; 137/614.11; 137/614.17
[58] Field of Search ...................... 137/490, 489.5, 469, 137/522, 495, 512, 512.1, 512.3, 512.5, 513, 494, 613, 614.16, 614.17, 614.11; 251/63; 267/9 B

[56] References Cited

U.S. PATENT DOCUMENTS

| | | | |
|---|---|---|---|
| 382,643 | 5/1888 | Fox | 137/490 X |
| 2,292,294 | 8/1942 | Rotter | 137/469 |
| 2,520,893 | 8/1950 | Stevenson | 137/490 |
| 2,674,260 | 4/1954 | Thrush | 137/469 |
| 2,821,996 | 2/1958 | Stevenson | 137/490 |
| 2,860,662 | 11/1958 | Gres | 137/469 |
| 3,073,585 | 1/1963 | Hanle | 267/9 B |
| 3,277,920 | 10/1966 | Von Arx | 251/63 X |

Primary Examiner—Alan Cohan
Attorney, Agent, or Firm—John H. Tregoning; James R. Duzan; Lucian Wayne Beavers

[57] ABSTRACT

An improved adjustable relief valve is provided having a valve body with a valve body inlet and outlet disposed therein. A reciprocating plunger is disposed in said valve body, and is movable between a first closed position isolating said valve body inlet and outlet, and a second open position communicating said valve body inlet and outlet. A pilot valve means is operatively associated with said plunger to control the flow of fluid from said valve body inlet to said plunger. Both said plunger and said pilot valve means have adjustable spring means for urging them toward their respective closed positions. An auxiliary means is provided for opening said relief valve without varying the adjustments of said spring means, so that said relief valve may be purged with a cleansing fluid.

31 Claims, 2 Drawing Figures

ADJUSTABLE RELIEF VALVE

The present invention relates generally to safety relief valves and more particularly, but not by way of limitation, to a safety relief valve including an adjustable pilot valve means which directs fluid to an adjustable main valve means.

Adjustable relief valves of the prior art generally include a single valve means which is controlled by an adjustable resilient spring means. Examples of such prior art devices are shown in U.S. Pat. No. 4,064,906 to Berg, U.S. Pat. No. 3,422,840 to Bryant et al., U.S. Pat. No. 3,409,037 to Nelson and U.S. Pat. No. 3,008,485 to Johnson et al.

It is desirable for an adjustable relief valve to release the high pressure fluid at some predetermined pressure and to provide for immediate full opening of the valve at the predetermined pressure so as to provide sufficient area to very quickly relieve the excess pressure when such occurs. A particular need for such an adjustable relief valve exists in high pressure pumping work involving positive displacement pumps. Examples of such pumps are those used for oil well cementing work.

Another problem existing with regard to safety relief valves for use on equipment such as oil field cementing pumps is that the fluid, i.e., the cement, may set up in the relief valves and render them inoperable.

The present invention provides an improved adjustable relief valve having a first adjustable pilot valve means which opens at a predetermined pressure level to direct fluid to a second adjustable main valve means which provides a large fluid flow area when open for quickly dumping the pressurized fluid.

The invention also provides a means for moving the second main valve to its open position without it changing the adjustment thereof. This allows a cleaning fluid, such as water, to be circulated through the valve to remove any of the working fluid, i.e., the cement, to thereby prevent the valve from becoming inoperable due to the setting up of the working fluid.

Figure 1A:
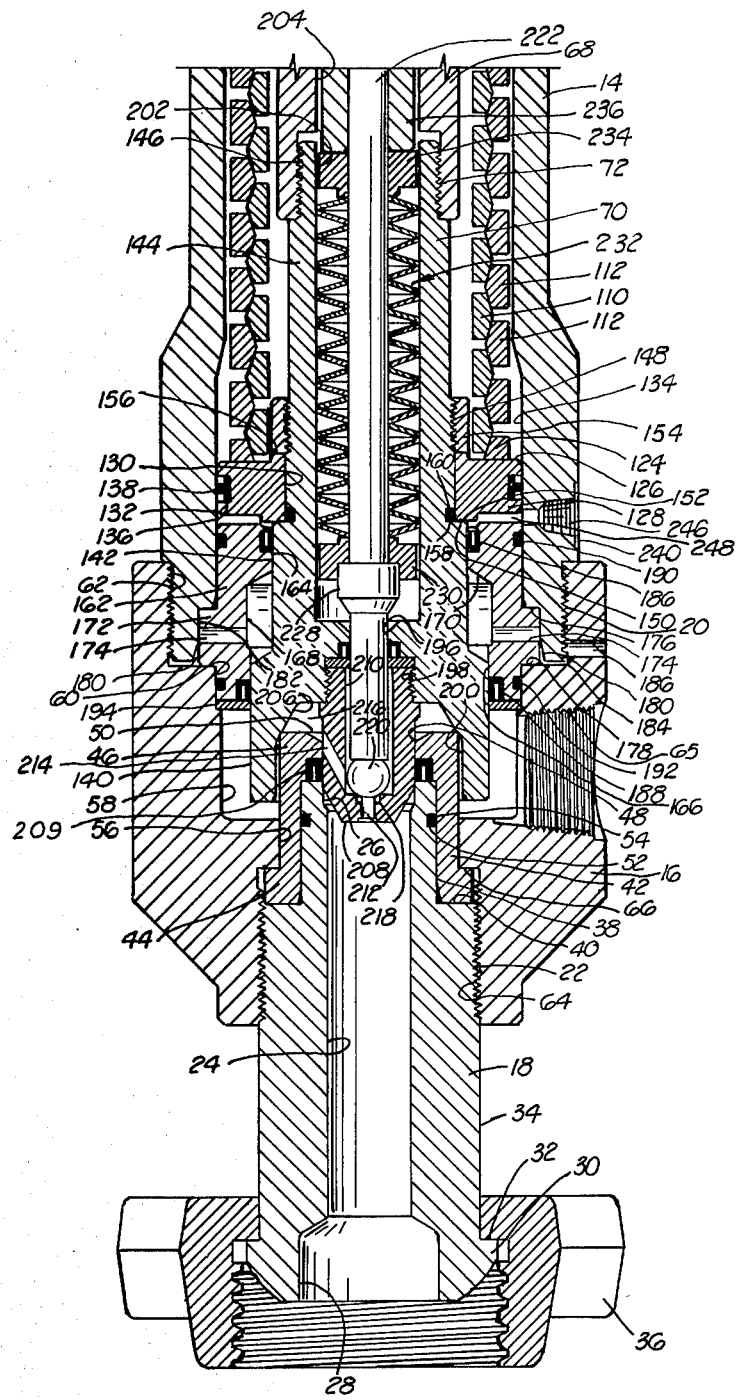

FIGS. 1 and 1A comprise a sectional elevation view of the improved adjustable safety relieve valve of the present invention.

Referring now to the drawings, the adjustable relief valve of the present invention is shown and generally designated by the numeral 10. The relief valve 10 includes a relief valve body generally designated by the numeral 12. The valve body 12 includes an upper body portion 14, a lower body portion 16, and a cylindrical inlet portion 18.

The upper body portion 14 is connected at its lower end to an upper end of lower body portion 16 at threaded connection 20. A lower end of lower body portion 16 is threadedly connected to an upper end of cylindrical inlet portion 18 at threaded connection 22.

Cylindrical inlet portion 18 has an axial inlet bore 24 therethrough. Inlet portion 18 includes upper and lower axial counterbores 26 and 28, respectively, communicating with upper and lower ends of cylindrical portion 18.

A lower end of the external surface of cylindrical portion 18 includes an enlarged diameter portion 30 forming an upward facing shoulder 32 extending radially outward from a cylindrical surface 34. A wing nut 36 fits about cylindrical surface 34 and is retained in place on cylindrical portion 18 by shoulder 32.

The upper end of cylindrical portion 18 includes a reduced diameter portion 38 forming a second upward facing shoulder 40.

A cylindrical plunger seat 42 is closely received about reduced diameter portion 38 and engages second shoulder 40. Plunger seat 42 includes an outwardly radially projecting flange 44 at its lower end, and an inwardly radially projecting flange 46 at its upper end. Inward projecting flange 46 includes an axial bore 48 therethrough which is concentric with and of the same diameter as upper counterbore 26 of cylindrical portion 18. A radially inner edge of inwardly projecting flange portion 46 includes an annular chamfered surface 50.

Reduced diameter portion 38 of cylindrical portion 18 includes an annular groove 52 having a resilient sealing ring 54 disposed therein.

Lower body portion 16 is cylindrical in shape and includes an axial bore 56. Lower body portion 16 also includes first, second and third upper counterbores 58, 60 and 62, respectively, a lower counterbore 64, and an outlet 65 disposed through a side wall of said lower body portion 16.

A downward facing shoulder 66 between bore 56 and lower counterbore 64 engages radially outward projecting flange portion 44 of plunger seat 42 so that when threaded connection 22 is made up, flange portion 44 is clamped between shoulder 66 of lower body portion 16 and shoulder 40 of cylindrical portion 18.

A plunger means, generally designated by the numeral 67 is axially disposed within valve body 12. Plunger means 67 may generally be referred to as a reciprocating valve member.

Plunger means 67 includes upper and lower plunger body portions 68 and 70, respectively, which are threadedly connected at threaded joint 72. An upper portion of upper plunger portion 68 is slidingly received within a ring spring adjuster 74. Ring spring adjuster 74 is of cylindrical configuration having an axial bore 75 therethrough and a radially outward projecting flange 76 at its lower end. A threaded external surface 78 of ring spring adjuster 74 engages a threaded portion 80 of a bonnet 82. Bonnet 82 is threadedly connected to upper body portion 14 at threaded connection 84.

A threaded lock ring 86 threadedly engages threaded portion 78 of ring spring adjuster 74 above bonnet 82. Lock ring 86 is locked in place by socket screw 88 which extends through lock ring 86 to engage a threaded hole 90 in bonnet 82.

Bonnet 82 includes a lower counterbore 92. A downwardly facing shoulder 93 between threaded portion 80 and counterbore 92 engages an upper shoulder of flange 76 of ring spring adjuster 74.

A lower end surface 94 of ring spring adjuster 74 includes an annular radially outer chamfered edge 96.

Chamfered edge 96 engages an annular radially inner complementary chamfered inner edge 98 of an upper ring spring support 100.

Upper ring spring support 100 is an annular shaped member having an axial bore 102 therethrough. Bore 102 is concentric with and of the same diameter and axially spaced from axial bore 75 of ring spring adjuster 74. Bore 102 also closely receives plunger means 67. Ring spring support 100 includes a lower reduced diameter portion 104. An annular radially outer downwardly facing shoulder 106 engages upper outer end ring spring 108.

Upper outer end ring spring 108 is engaged by an inner ring spring 110. Inner ring spring 110 engages an outer ring spring 112.

Alternating inner and outer ring springs 110 and 112 comprise a stacked ring spring generally designated by the numeral 114. Each of the outer ring springs includes radially inner upper and lower tapered surfaces 116 and 118, respectively. Surfaces 116 and 118 are preferably tapered at an angle of approximately 14° from the vertical.

Each of the axially spaced inner ring springs 110 includes radially outer upper and lower tapered surfaces 120 and 122.

Each of the upper tapered surfaces 120 of inner ring springs 110 engages a lowered tapered surface 118 of an outer ring spring 112. Each of the lower tapered surfaces 122 of an inner ring spring 110 engages an upper tapered surface 116 of an outer ring spring 112.

Upper outer end ring spring 108 is essentially the lower half of an outer ring spring 112.

The lowermost radially inner ring spring 110 engages a lower outer end ring spring 124 which is essentially the upper half of an outer ring spring 112.

Lower outer end ring spring 124 engages an upper surface 126 of a piston 128. Piston 128 is of annular shape including an axial bore 130 which closely receives lower plunger portion 70 therein. A radially outer end surface 132 of piston 128 is closely received within a cylindrical inner portion 134 of upper body portion 14. An annular groove 136 is disposed in radially outer surface 132 and contains a resilient sealing ring 138 therein. Lower plunger portion 70 has a cylindrical outer surface 140 with first, second and third successively reduced diameter portions 142, 144 and 146, respectively. Second reduced diameter portion 144 includes a threaded portion 148.

A lower end 150 of piston 128 engages a shoulder 152 between first and second reduced diameter portions 142 and 144. Piston 128 is held with lower end 150 engaging shoulder 152 by a lock nut 154 which threadedly engages threaded portion 148 and engages an upper surface 156 of piston 128.

An annular groove 158 is disposed in second reduced diameter portion 144 adjacent shoulder 152. Resilient sealing ring 160 is disposed in groove 158.

Cylindrical outer surface 140 and first reduced diameter portion 142 of lower plunger portion 70 are closely received within plunger sealing ring 162. Plunger sealing ring 162 has an axial bore 164 communicating with its upper surface. A counterbore 166 communicates with the lower surface of sealing ring 162. Between counterbore 166 and axial bore 164 is an increased diameter bore portion 168 which is of slightly larger internal diameter than counterbore 166. Between increased diameter portion 168 and bore 164 is an annular chamfered bore portion 170.

Plunger sealing ring 162 includes a radially outward projecting ridge 172 adjacent increased diameter bore portion 168. Ridge 172 has a plurality of vent ports 174.

Upper and lower surfaces of ridge 172 are engaged by shoulders 176 and 178 of upper body portion 14 and lower body portion 16, respectively. Vent ports 174 exit shoulder 172 adjacent a chamfered annular internal edge 180 of a lower counterbore 182 of upper body portion 14.

The depth of lower counterbore 182 of upper body portion 14 is slightly smaller than the axial thickness of radially extending ridge 172 so that a small annular clearance gap 184 is present between a lower end of upper body 14 and the shoulder 178 of lower body portion 16. An exit relief port 186 communicates with clearance gap 184. This permits any high pressure fluid leaking into the inner part of sealing ring 162 to be vented to the atmosphere through ports 174, chamfered annular surface 180, clearance 184 and exit port 186.

Plunger sealing ring 162 has inner annular seal means 186 and 188 disposed between bore 164 and counterbore 166, respectively, and plunger means 67. Sealing rings 186 and 188 are preferably bal seals and are disposed in annular grooves.

Plunger sealing ring 162 also includes upper and lower resilient sealing rings 190 and 192 sealing between the plunger sealing ring 162 and upper and lower body portions 14 and 16, respectively.

A bottom end surface of plunger sealing ring 162 is engaged by a steel washer 194 which rests upon an upward facing shoulder of an internal bore of lower body portion 16.

The details of construction of plunger means 67 will now be described. As previously indicated, plunger means 67 includes the upper plunger portion 68 and the lower plunger portion 70 connected at threaded connection 72.

Lower plunger portion 70 includes an axial bore 196 with first and second successive lower counterbores 198 and 200, respectively. Lower plunger portion 70 also includes an upper counterbore 202 communicating with an upper end of lower plunger portion 70. Upper plunger portion 68 includes an axial bore 204.

Between first and second lower counterbores 198 and 200, there is located an annular sloped bearing surface 206 which engages plunger seat 42 when plunger means 67 is in the closed position illustrated in FIGS. 1 and 1A.

First lower counterbore 198 is threaded and receives therein a pilot valve nose portion or pilot valve body 208. Annular seal means 209 seals between nose portion 208 and flange portion 46 of plunger seat 42. Nose portion 208 includes an axial bore or cavity 210 which communicates with axial bore 196 of lower plunger portion 70. Nose portion 208 includes an inlet port 212 which communicates bore 210 with inlet bore 24. Nose portion 208 also includes outlet port 214 which communicates bore 210 with an annular chamber 216 defined between nose portion 208 and second lower counterbore 200 and annular chamfered portion 206. This communication is made possible in the closed position of plunger means 67 shown in FIG. 1 by the annular chamfered surface 50.

An upper end of inlet port 212 is surrounded by pilot valve seat insert 218.

Pilot valve insert seat 218 is sealingly engaged by pilot valve ball 220. Pilot valve ball 220 is engaged from above by pilot rod 222. Pilot rod 222 extends completely through upper and lower plunger portions 68 and 70 and has a hex nut 224 connected to a threaded upper end 226 of pilot rod 222.

Pilot rod 222 includes an enlarged diameter portion 228 having a diameter larger than bore 196 of lower plunger portion 70. Large diameter portion 228 is located just above axial bore 196 within upper counterbore 202 of lower plunger portion 70. An upper shoulder of enlarged diameter portion 228 is engaged by lower pilot valve spring support 230. Located above and engaging spring support 230 is pilot valve spring means 232. Pilot valve spring means 232 is preferably a stacked snap disk or Belleville type spring as will be understood by those skilled in the art. This type of spring provides a snap-type action which allows for a rapid step-type compression of the spring upon reaching a predetermined compression load across the spring.

An upper end of spring means 232 is engaged by upper pilot valve spring support 234. Upper pilot valve spring support 234 is engaged by pilot adjuster 236. Pilot adjuster 236 is a cylindrical tubular member of length slightly greater than upper plunger portion 68. Pilot adjuster 236 has a threaded upper end portion 238 which threadedly engages a threaded upper portion 240 of upper plunger portion 68. Pilot adjuster 236 is retained in any given adjusted position by hex jam nut 242. Located above hex jam nut 242 is a hex-shaped portion 244 of pilot adjuster 236 which may be engaged by a conventional wrench.

In summary, relief valve 10 comprises a main valve means for relieving fluid under pressure from a vessel, a pilot valve means operatively associated with the main valve means for initially directing said fluid under pressure to said main valve means, and a bypass valve means responsive to opening of said main valve means for opening a flow path bypassing said pilot valve means.

Said main valve means comprises plunger means 67, movable between a first closed position sealingly engaging plunger seat 42 to isolate inlet bore 24 and outelt 65, and a second open position communicating inlet 24 and outlet 65. The main valve means is adjustable by varying a compression preload on spring means 114 to vary a predetermined fluid pressure at which said fluid is relieved.

Said pilot valve means comprises nose 208 having ball 220 disposed therein movable between a first closed position sealingly engaging seat 218 to isolate inlet bore 24 from said main valve means, and a second open position initially communicating inlet bore 24 and said main valve means. Said pilot valve means is adjustable by varying a compression preload on spring means 232 to vary a predetermined pressure at which said fluid is directed to said main valve means.

Said bypass valve means comprises the outer cylindrical surface of nose member 208 which is initially closely received within bore 48 of flange 46 of plunger seat 42 and sealed by said seal means 209 when plunger means 67 is in its closed position. When plunger means 67 is moved upward toward its open position nose member 208 which is attached thereto is moved, in response to the opening movement of plunger means 67, out of engagement with seal 209 and bore 48 thereby opening a flow path between nose member 208 and plunger seat 42 bypassing the pilot valve means.

Relief valve 10 also includes an auxiliary port 246 and piston 128 which provides an auxiliary means for opening said main valve means, without varying the adjustment thereof, so that the components of said main valve means may be purged with a cleansing fluid such as water to prevent the setting up of cement within relief valve 10.

The operation of the adjustable relief valve of the present invention is as follows.

Pilot valve ball 220 is movable between a first closed position illustrated in FIG. 1A and a second open position (not shown) having ball 220 lifted above seat 218 to place inlet and outlet ports 212 and 214 in fluid communication.

Plunger means 67 is movable from the first closed position with annular surface 206 engaging plunger seat 42 to isolate inlet 24 from outlet 65 as shown in FIG. 1A and a second open position (not shown) wherein plunger means 67 is raised relative to plunger seat 42 so that inlet bore 24 and outlet 65 of valve body 12 are placed in fluid communication.

When plunger means 67 moves upward toward its open position nose member 208 is moved out of engagement with seal 209 and bore 48 of plunger seat 42 thereby opening the flow path therebetween bypassing the pilot valve means.

The safety relief valve 10 is mounted upon a high pressure vessel by means of wing nut 36. The high pressure fluid is communicated with the relief valve through inlet bore 24. When the high pressure fluid reaches a predetermined level, the force exerted through inlet port 212 against pilot ball 220 is sufficient to compress pilot spring means 232 causing it to snap open thereby allowing pilot ball 220 to move to its second open position. The high pressure fluid is then ported through inlet port 212, bore 210 and outlet port 214 to the annular area 216 between the nose portion 208 and lower plunger portion 70. The upward force exerted on lower plunger portion 70 by the high pressure fluid contained in annular space 216 then acts to compress plunger spring means 114. Upon compression of plunger spring means 114, the plunger means 67 moves upward to its second open position thereby moving nose portion 208 out of engagement with inlet bore 24 so that inlet bore 24 is communicated with outlet bore 65 through the bypass flow path between nose portion 208 and plunger seat 42 so that the pressurized fluid may be rapidly dumped through the relief valve 10.

The stacked ring plunger spring means 114 is of such a design that it has a very low recoil due to frictional forces between the inner and outer adjacent spring rings 110 and 112. After the initial force required to compress the stacked ring spring 114 is applied, a much smaller force will retain the stacked ring spring 114 in the compressed position, thereby allowing plunger means 67 to remain in its second open position until the pressure within the vessel to which the safety relief valve 10 is attached has fallen to a level far below that which was initially required to open the relief valve 10. This allows the relief valve 10 to completely vent the high pressure fluid in a rapid manner.

The fluid pressure in inlet bore 24, required to move pilot valve ball 220 to its open position, may be adjusted by loosening the hex jam nut 242 and turning pilot adjuster 236 to vary the initial compression of pilot valve spring means 232.

Similarly, the pressure required to move plunger means 67 to its second open position may be varied by loosening hex socket screw 88 and then rotating ring spring adjuster 74 to vary the initial compression of plunger spring means 114.

As previously indicated, the relief valve 10 is specifically designed for use with high pressure cementing fluids as used in the cementing operations on oil well boreholes. When dealing with such fluids it is very important that the relief valve be constructed so that it may be cleaned up to eliminate any of the cement which might otherwise set up within the valve and render it inoperable. This is easily achieved in the safety relief valve of the present invention without varying the adjustment of either the pilot valve spring means 232 or the stacked ring spring 114 as follows.

An auxiliary source (not shown) of high pressure fluid is connected to a port 246 and is communicated to an annular space 248 between piston 128 and plunger sealing ring 162. Due to the much larger area of piston 128 exposed to the auxiliary source of fluid pressure, as compared to annular area of chamber 216 exposed to the pressure in inlet bore 24 when plunger means 67 is in the closed position illustrated in FIGS. 1 and 1A, a much lower auxiliary pressure is required to generate sufficient compressional force across ring spring means 114 to compress it and move plunger means 67 to its second open position. The port 246 is at all times in fluid isolation from inlet bore 24. The pilot valve ball 220 is moved to its second open position by tightening hex nut 224 to further compress pilot valve spring means 232. Then a cleaning fluid such as water is circulated through the valve. Then, the pressure on auxiliary port 246 is relieved and hex nut 224 is backed off so that the pilot valve spring means 232 and the stacked ring spring means 114 are once again at their desired initial preset adjusted positions.

Thus, the adjustable relief valve of the present invention is well adapted to obtain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A safety relief valve, comprising:
a main valve means for relieving fluid under pressure;
a pilot valve means, operatively associated with said main valve means, for initially directing said fluid under pressure to said main valve means; and
a bypass valve means, responsive to opening of said main valve means, for opening a flow path bypassing said pilot valve means.

2. Apparatus of claim 1, wherein:
said pilot valve means is adjustable to vary a predetermined pressure at which said fluid is initially directed to said main valve means.

3. Apparatus of claim 1, wherein:
said main valve means is adjustable to vary a predetermined pressure at which said fluid is relieved.

4. Apparatus of claim 3, further comprising:
auxiliary means for opening said main valve means, without varying the adjustment of said main valve means, so that said relief valve may be purged with a cleansing fluid.

5. A safety relief valve comprising:
a relief valve body having an inlet and an outlet disposed therein;
a main valve means disposed in said relief valve body, movable between a closed position isolating said inlet and outlet, and an open position communicating said inlet and outlet;
a pilot valve means, disposed in said relief valve body, movable between a closed position isolating said inlet and said main valve means, and a second position initially communicating said inlet and main valve means; and
a bypass valve means, responsive to said movement of said main valve means to its said open position, for opening a flow path bypassing said pilot valve means.

6. A safety relief valve comprising:
a relief valve body, having a valve body inlet and a valve body outlet;
a pilot valve means, having a pilot valve inlet and a pilot valve outlet, said pilot valve inlet communicating with said valve body inlet;
a plunger, movable between a first closed position isolating said valve body inlet and outlet, and a second open position communicating said valve body inlet and outlet;
a chamber, disposed within said relief valve, said chamber communicating said pilot valve outlet with an end of said plunger so that at a predetermined valve body inlet pressure said pilot valve will open initially directing fluid under pressure to said chamber to move said plunger to said open position to communicate said valve body inlet, said valve body outlet and said chamber; and
a bypass valve means, responsive to said movement of said plunger to its said second open position, for opening a flow path bypassing said pilot valve means.

7. Apparatus of claim 6, wherein said pilot valve means further comprises:
a pilot valve body having said pilot valve inlet and outlet disposed therein;
a seat, disposed in said pilot valve body between said inlet and outlet;
a sealing member engaging said seat when said pilot valve means is in a closed position; and
resilient spring means for urging said sealing member toward said closed position.

8. Apparatus of claim 7, wherein:
said spring means of said pilot valve means is adjustable so that the inlet fluid pressure required to open said pilot valve means is adjustable.

9. Apparatus of claim 7, wherein:
said pilot valve body is attached to said plunger so that said pilot valve body moves with said plunger.

10. Apparatus of claim 9, further comprising:
a plunger spring, located between said relief valve body and said plunger to urge said plunger towards said first closed position.

11. Apparatus of claim 10, wherein said plunger spring comprises:
a plurality of axially spaced outer spring rings; and
a plurality of axially spaced inner spring rings, with radially outer surfaces of said inner rings engaging radially inner surfaces of said outer rings.

12. Apparatus of claim 10, wherein said plunger spring is adjustable so that the fluid pressure in said chamber required to move said plunger to said second open position is adjustable.

13. Apparatus of claim 10, wherein:
said plunger includes a piston sealingly engaging an inner cylindrical bore of said relief valve body; and
said relief valve body has a port means disposed therein for communicating an auxiliary fluid pressure supply with a surface of said piston to move said plunger to said second open position.

14. Apparatus of claim 6, further comprising:
a plunger spring, located between said relief valve body and said plunger to urge said plunger towards said first closed position, said plunger spring being adjustable so that the fluid pressure in said chamber required to move said plunger to said second open position is adjustable.

15. Apparatus of claim 6 wherein:
said plunger includes a piston sealingly engaging an inner cylindrical bore of said relief valve body; and said relief valve body has a port disposed therein for communicating an auxiliary fluid pressure supply with a surface of said piston to move said plunger to said second open position such that said relief valve may be purged with a cleansing fluid.

16. A relief valve comprising:

a valve body, having a substantially cylindrical inner cavity, a first end of said valve body having an inlet bore disposed therein; and plunger means, disposed within said inner cavity, a first end of said plunger means including a cylindrical axially extending portion and an axially extending nose, said cylindrical portion and nose defining an annular chamber therebetween for receiving an annular plunger seal surrounding said inlet bore, said plunger means being movable between a first closed position, with said first end of said plunger sealingly engaging said plunger seat and said nose being closely received within said inlet bore, and a second open position communicating said inlet bore with an outlet disposed in said valve body, said plunger means including a pilot valve movable between a first closed position, isolating said annular chamber from said inlet bore, and a second open position communicating said annular chamber and said inlet bore.

17. Apparatus of claim 16, wherein:

said nose has an inner cavity disposed therein, and includes inlet and outlet ports communicating said nose cavity with said valve body inlet bore and said annular chamber, respectively; and said pilot valve includes a sealing member which sealingly engages a pilot valve seat to close said inlet port when said pilot valve is in said first closed position.

18. Apparatus of claim 17, wherein:

said pilot valve includes an adjustable spring means for urging said sealing member towards said pilot valve seat, so that the inlet fluid pressure required to open said pilot valve may be varied.

19. Apparatus of claim 16, wherein:

said first end of said plunger means includes an annular tapered surface located between said cylindrical portion and said nose, said tapered surface partially defining said annular chamber, and said tapered surface being constructed to sealingly engage said annular plunger seat when said plunger means is in said first closed position.

20. Apparatus of claim 16, wherein:

said plunger means further includes a piston sealingly engaging said cylindrical inner cavity of said valve body for reciprocating movement therein; and said valve body has a port disposed therein for supplying fluid under pressure to a surface of said piston to move said plunger means to said second open position.

21. Apparatus of claim 20, wherein:

said valve body port is characterized as being in fluid isolation from said valve body inlet bore.

22. Apparatus of claim 16, further comprising:

a plunger spring, located between said valve body and said plunger means so that said plunger means is urged toward said first closed position.

23. Apparatus of claim 22, wherein:

said plunger spring is a stacked ring spring; and said relief valve includes a plunger spring adjusting means for varying a compression preload on said plunger spring to vary the fluid pressure required in said annular cavity to move said plunger means to said second open position.

24. A safety relief valve comprising:

a relief valve body having an inlet and an outlet disposed therein;

a main valve means disposed in said relief valve body;

a pilot valve means disposed in said relief valve body;

said relief valve body, said main valve means and said pilot valve means having a first chamber formed therebetween, said pilot valve means being movable between a closed position isolating said inlet and said first chamber and a second position initially communicating said inlet and said first chamber, said main valve means being movable between a closed position isolating said inlet, outlet and first chamber and an open position communicating said inlet, outlet and first chamber; and a bypass valve means, responsive to said movement of said main valve means to its said open position, for opening a flow path bypassing said pilot valve means.

25. Apparatus of claim 24 wherein said pilot valve means includes an adjustable spring means for urging said pilot valve means toward said closed position such that the inlet fluid pressure required to move said pilot valve means to said second position can be varied.

26. Apparatus of claim 25 wherein said main valve means includes an adjustable spring means for urging said main valve means toward said closed position such that the inlet pressure required to maintain said main valve means in said open position can be varied.

27. Apparatus of claim 26 wherein said main valve adjustable spring means comprises:

a plurality of axially spaced outer spring rings; and a plurality of axially spaced inner spring rings, with the radially outer surfaces of said inner rings engaging the radially inner surfaces of said outer rings.

28. Apparatus of claim 27 wherein said pilot valve spring means comprises a stacked snap disc spring.

29. The apparatus of claim 24 which further comprises auxiliary means for opening said main valve means, without varying the adjustment of said main valve means, so that said relief valve may be purged with a cleansing fluid.

30. Apparatus of claim 29 wherein said auxiliary means comprises:

an auxiliary hydraulic means disposed in said relief body and connected to said main valve means such that pressure in said auxiliary hydraulic means moves said main valve means to an open position; and said relief valve body having a port disposed therein for communicating an auxiliary fluid pressure supply with said auxiliary hydraulic means.

31. Apparatus of claim 30 which further includes second auxiliary means for opening said pilot valve means, without varying the adjustment of said pilot valve means, so that said pilot valve means may be purged with a cleansing fluid.

* * * * *